United States Patent [19]
Avitzour

[11] Patent Number: 5,525,883
[45] Date of Patent: Jun. 11, 1996

[54] MOBILE ROBOT LOCATION DETERMINATION EMPLOYING ERROR-CORRECTING DISTRIBUTED LANDMARKS

[75] Inventor: Daniel Avitzour, Jerusalem, Israel

[73] Assignee: Sara Avitzour, Jerusalem, Israel

[21] Appl. No.: 272,338

[22] Filed: Jul. 8, 1994

[51] Int. Cl.$^6$ .................................................. G06F 15/50
[52] U.S. Cl. .................... 318/587; 318/568.1; 364/449; 364/424.02
[58] Field of Search .................................. 318/139, 587, 318/568.01–568.12; 364/424.02, 424.06, 426, 449, 444, 571; 180/79.1, 167, 168, 169; 901/1, 2, 3

[56] References Cited

U.S. PATENT DOCUMENTS

| | | | |
|---|---|---|---|
| 4,689,747 | 8/1987 | Kurose et al. | 364/449 |
| 4,992,947 | 2/1991 | Nimura et al. | 364/444 |
| 5,051,906 | 9/1991 | Evans, Jr. et al. | 364/424.02 |
| 5,115,399 | 5/1992 | Nimura et al. | 364/449 |
| 5,121,326 | 6/1992 | Moroto et al. | 364/449 |
| 5,144,685 | 9/1992 | Nasar et al. | 345/88 |
| 5,204,814 | 4/1993 | Noonan et al. | 364/424.02 |
| 5,208,757 | 5/1993 | Appriou et al. | 364/456 |
| 5,319,467 | 7/1994 | Nagamune et al. | 364/561 |
| 5,331,578 | 7/1994 | Stieler | 364/571.01 |
| 5,374,933 | 12/1994 | Kao | 364/449 |
| 5,400,244 | 3/1995 | Watanabe et al. | 364/424.02 |

OTHER PUBLICATIONS

Maddox, "Smart Navigational Sensors for Automatic Guided Vehicles," Sensors, Apr. 1994, pp. 48–50.

Petriu et al., "Two–Dimensional Position Recovery for a Free–Ranging Automated Guided Vehicle," IEEE Transactions on Instrumentation and Measurement, vol. 42, No. 3, Jun. 1993, pp. 701–706.

Khalfallah et al., "Visual Position Recovery for an Automated Guided Vehicle," IEEE Transactions on Instrumentation and Measurement, vol. 41, No. 6, Dec. 1992, pp. 906–910.

Kim et al., "Real–time Determination of a Mobile Robot's Position by Linear Scanning of a Landmark," Robotica, vol. 10, 1992, pp. 309–319.

Petriu, "Automated Guided Vehicle with Absolute Encoded Guide–Path," IEEE Transactions on Robotics and Automation, vol. 7, No. 4, Aug. 1991, pp. 562–565.

Murphy, "A Strategy for the Fine Positioning of a Mobile Robot Using Texture," SPIE vol. 1195 Mobile Robots IV, 1989, pp. 267–279.

Shyi et al., "Robot Guidance Using Standard Mark," Electronics Letters, vol. 24, No. 21, Oct. 13, 1988, pp. 1326–1327.

Kabuka et al., "Position Verification of a Mobile Robot Using Standard Pattern," IEEE Journal of Robotics and Automation, vol. RA–3, No. 6, Dec. 1987, pp. 505–516.

McVey et al., "Range Measurements by a Mobile Robot Using a Navigation Line," IEEE Transactions on Pattern Analysis and Machine Intelligence, vol. PAMI–8, No. 1, Jan. 1986, pp. 105–109.

*Primary Examiner*—Paul Ip
*Attorney, Agent, or Firm*—Covington & Burling

[57] ABSTRACT

An apparatus and method are disclosed for using specially designed landmarks to provide the position and orientation in three dimensions of an autonomous vehicle, such as a mobile robot. The landmarks are checkerboards of rectangular cells of contrasting colors that are arranged to create a pseudo-random pattern. The autonomous vehicle carries a recognition and measurement unit, for example including a camera and a digital computer that processes the output of the camera. A map stored in the recognition and measurement unit describes the position, orientation and dimensions of each pseudo-random checkerboard pattern. The recognition and measurement unit processes the image of a pseudo-random checkerboard pattern to identify the landmark on which the pattern is displayed and to calculate the position and orientation of the autonomous vehicle. The pseudo-randomness of each checkerboard pattern enables determination of the position and orientation determination of the autonomous vehicle even if partial errors are made in visual interpretation of the landmark.

23 Claims, 11 Drawing Sheets

Edge Grid

Principal Directions dir1        dir2

Grid Densities

Grid Phases

Image Center 4 x 4 block

Code = 1110101010010110

4 x 4 block after 90 degree rotation

Code = 0111100110110100

Fig. 6

Sobel Edge Operator

| X(1) | X(2) | X(3) |
|------|------|------|
| X(4) | X(5) | X(6) |
| X(7) | X(8) | X(9) |

3 x 3 Neighborhood

Sobel Edge Example

| 1 | 1 | 0 |
|---|---|---|
| 1 | 1 | 0 |
| 0 | 1 | 0 | dhor = (1 + 2 * 1 + 0) − (0 + 2 * 1 + 0) = 1 dver = (1 + 2 * 1 + 0) − (0 + 2 * 0 + 0) = 3

Edge-Intensity = $1^2 + 3^2$ = 10

Edge-Direction = atan(3/1) = 1.25 radians

Base Digital Element Coordinates

Landmark Plane (zlc = 0)

Histogram of Edge Directions

Smoothed Histogram of Edge Directions

Fig. 10

Decoded bit array of Fig. 3A

0 = Black
1 = White
· = Dontcare

```
................................................................
................................................................
................................................................
................................................................
................................................................
................................................................
................................................................
................................................................
................................................................
................................................................
................................................................
................................................................
................................................................
................................................................
................................................................
................................................................
................................................................
................................................................
................................................................
................................................................
..............001...............................................
..............00111.............................................
..............110101............................................
..............001110............................................
...............100110...........................................
................001.............................................
................................................................
................................................................
................................................................
................................................................
................................................................
```

MOBILE ROBOT LOCATION DETERMINATION EMPLOYING ERROR-CORRECTING DISTRIBUTED LANDMARKS

BACKGROUND OF THE INVENTION

This invention relates to location determination, and more particularly to a method and apparatus employing spatially distributed landmarks for determining the position and orientation of an autonomous vehicle within a facility.

DESCRIPTION OF THE RELEVANT ART

Autonomous vehicles, such as mobile robots, frequently are required to navigate in a working environment. Navigation entails planning a path, controlling the vehicle along the path, avoiding obstacles, and fine positioning the vehicle with respect to target objects, a process known in the art as "docking." The working environment itself may include both fixed, movable and moving objects.

To facilitate mobile robot navigation, it is advantageous to provide a mobile robot with information about the precise position and orientation of the mobile robot relative to a fixed coordinate system. Such information may help a mobile robot in planning and following a route, in docking maneuvers, and in coordinating with other systems, including other mobile robots.

Commonly-used methods for providing a robot with such information include dead reckoning, inertial navigation, and satellite-based positioning. Each of these techniques has disadvantages. With dead reckoning and inertial navigation, the autonomous vehicle keeps track of its various movements and calculates its position and orientation accordingly. However, inaccuracies in tracking or calculation are cumulative, so that a series of small errors can lead to substantial mistakes, especially in docking.

Satellite-based positioning requires a clear communications path to a satellite and also does not provide location information with the precision required for docking maneuvers. Other methods for providing mobile robots with precise position and orientation information involve placing specially designed objects at known positions in the working environment, to be used as landmarks. These landmarks are sensed by a vision system carried by the mobile robot. The visual information about the landmarks is processed by the robot, enabling it to detect and recognize the various landmarks, and to determine its own position with respect to them.

Current landmark methods suffer from several disadvantages. Especially if the working environment is cluttered or unevenly lit, or if the landmarks are partially occluded, errors may occur in detecting or recognizing the landmarks, resulting in errors in the position determined for the mobile robot. In addition, the processing in many current landmark systems needed to extract information from visual images requires substantial computational resources, which makes such systems difficult and expensive to implement in applications requiring the mobile robot to determine its position in real time.

SUMMARY OF THE INVENTION

An object of the invention is a method for designing and using visual landmarks, which produces precise position and orientation information for autonomous vehicles, is relatively insensitive to errors in visual interpretation, and is simple enough to be implemented in a real time system.

Another object of the invention is a method for marking objects in the working environment of a mobile robot, including workstations and other mobile robots, so that the markings may be uniquely identified by the mobile robot.

A further object of the invention is a system based on visual landmarks to enable an autonomous vehicle moving in three-dimensional space, such as a robot arm or a legged robot, precisely to determine its position and orientation in three dimensions.

The present invention, as broadly described herein, provides a method and apparatus for determining the position and orientation of an autonomous vehicle from visual information imaged by that vehicle from a space containing specially designed landmarks. The landmarks are encoded checkerboards of rectangular cells, each cell displaying one of two contrasting colors, such as black or white. The cells are colored and arranged so as to create a pseudo-random pattern. The landmarks may be painted or paved on a flat surface such as a floor, a ceiling, a wall or an equipment rack. The landmarks may cover the surface completely or partially, and may vary in color, size and shape throughout the working environment.

The mobile robot carries a recognition and measurement unit for detecting the landmarks and determining the robot's position and orientation. The recognition and measurement unit includes a video camera and a computer system for processing the output of the camera. The computer system memory includes mapping information that identifies and provides the position, orientation and size of each landmark in the working environment.

By processing the camera images of a landmark, the recognition and measurement unit identifies the imaged landmark and precisely calculates, in three dimensions, the location and orientation of the mobile robot. The unit accomplishes this task even if partial errors in visual interpretation of a landmark are introduced from factors such as insufficient light, partial occlusion of the landmark, deterioration of the landmark colors over time or imperfect camera calibration. This insensitivity to errors in visual interpretation is due to the information redundancy inherent in the pseudo-random patterns. In this respect, the landmarks used in this invention may be considered as a generalization to the spatial domain of the error-correcting codes used in communication and other systems. The landmarks according to this invention also are "distributed" in the sense that the position and orientation of the mobile robot can be determined from the information provided by any field of view in which a significant portion of a landmark is visible.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 6 illustrates an example of the operation of a Sobel edge operator;

FIG. 10 illustrates the decoded bit array that results from the decoding function.

DETAILED DESCRIPTION OF THE PREFERRED EMBODIMENTS

Figure 1:
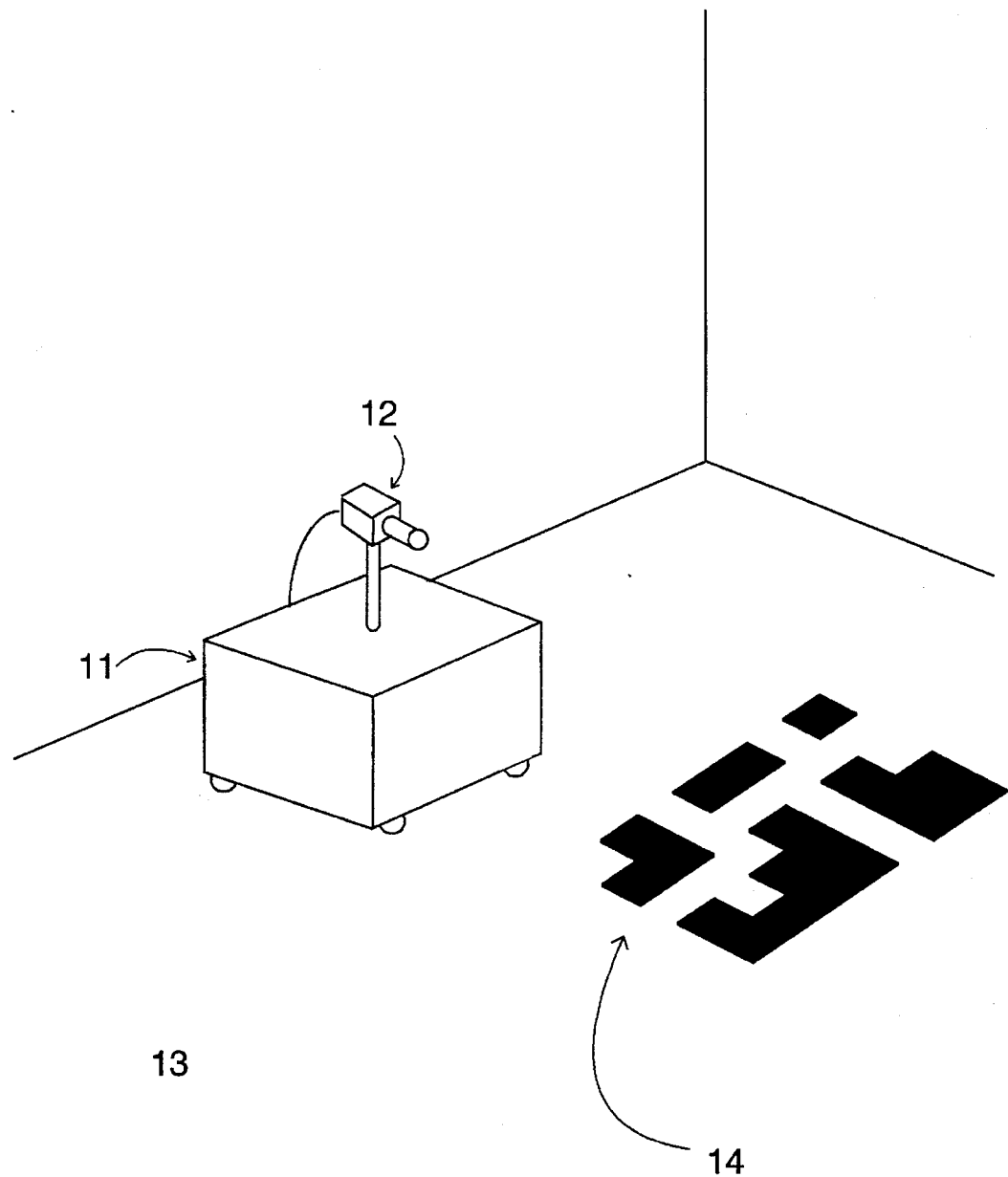
FIG. 1 is an illustration diagram of a mobile robot operated according to one embodiment of the invention, with the mobile robot carrying a camera that is looking at a surface which contains a landmark.

Reference is now made in detail to the present preferred embodiments of the invention, examples of which are illustrated in the accompanying drawings and described in the following description, wherein like reference numerals indicate like elements throughout the several views.

Notations

The following mathematical notations are repeatedly used in the detailed description.

| | |
|---|---|
| * | multiplication |
| {a,b} | The range of values between a and b, including a but not b. |
| {a,b} | The range of values between a and b, including a and b. |
| round(x) | The integer nearest to x. |
| floor(x) | The largest integer not greater than x. |
| v(n:m) | Subvector of vector v, consisting of entries n through m. |
| tan(x) | Tangent function of x, where x is expressed in radians. |
| sin(x) | Sine function of x, where x is expressed in radians. |
| cos(x) | Cosine function of x, where x is expressed in radians. |
| acos(x) | Inverse cosine of x, in radians. |
| atan(x) | Inverse tangent of x, in radians. |

Detailed Description of the Invention

FIG. 1 shows a mobile robot 11 equipped with a camera 12, looking at a flat surface 13. This surface contains a landmark 14 displaying a pseudo-random checkerboard pattern. The camera 11 images the pseudo-random checkerboard pattern displayed by the landmark 14 using light reflected from the flat surface 13. The origin of this light may be a light source carried by the mobile robot 11, or light generally available in the environment.

The landmark 14 may be painted or paved on any flat surface 13 such as a floor, a ceiling, a wall, or an equipment rack. The landmark 14 may cover the flat surface 13 completely or partially.

Each landmark 14 preferably is a contiguous portion of a planar surface, covered by a pattern which consists of a checkerboard of squares or rectangular cells. Each square or rectangular cell preferably is colored with one of two contrasting colors. In a preferred embodiment, the two contrasting colors are black and white, and for the sake of simplicity, the terms "black" and "white" are used throughout this description to illustrate the two contrasting colors. The two contrasting colors in this invention may also be assigned binary values, zero and one, and accordingly may be referred to as the "bits" coded in the checkerboard pattern. Separate landmarks may be displayed on different planes, and may vary in colors, cell size and orientation.

Each cell in each pattern on each landmark 14 is colored so that the arrangement of cells creates a pseudo-random checkerboard pattern. Rectangular arrays of the cells within the pattern may be referred to as blocks, and have a predetermined size. Cells of contrasting colors are arranged in the pseudo-random checkerboard pattern so that the arrangement displayed by each block of cells would not recur within a large area, even if the arrangement were rotated 90, 180 or 270 degrees. For this purpose, this large area needs to be large in comparison to the average location uncertainty of the mobile robot 11 within the overall space in which the robot may travel in the particular application. In a preferred embodiment, approximately 50% of the cells in each landmark 14 are black, and the arrangement displayed by each four-by-four block of cells does not recur, even if the four-by-four block were rotated 90, 180 or 270 degrees. The designer of the landmark may achieve the required pseudo-randomness in many ways, including by deriving bits from a pseudo-random bit generator and assigning a color to each cell corresponding to the derived bit value, or by using any of the pseudo-random array designs known in the mathematical discipline of error-correcting codes.

The use of four-by-four blocks in this description and in a preferred embodiment is not based on any special properties of the number four, and a designer could well utilize five-by-five blocks or any other convenient size. Performance differences may exist, however, in systems using blocks of different sizes. For the sake of simplicity of exposition, the detailed description of the invention will be presented in terms of four-by-four blocks.

While the rectangular cells are displayed on a flat surface, the blocks of cells are not physically separate units. In particular, two blocks are considered to be different so long as one block includes at least one cell not included in the other block. For example, in a rectangular pattern with ten cells on one side and twelve cells on the other side, the rectangular pattern has sixty-three blocks of size four-by-four.

The camera 12 may be rigidly fixed to the body of the mobile robot 11, or may be free to move relative to the mobile robot 11 and scan the vicinity of the mobile robot 11. A preferred embodiment includes means for monitoring the position and orientation of the camera 12 with respect to the mobile robot 11 and means for determining the position and orientation of the mobile robot 11 from the position and orientation of the camera 12. In a preferred embodiment, such monitoring and determining means would include an appropriate electro-mechanical device.

Figure 2:
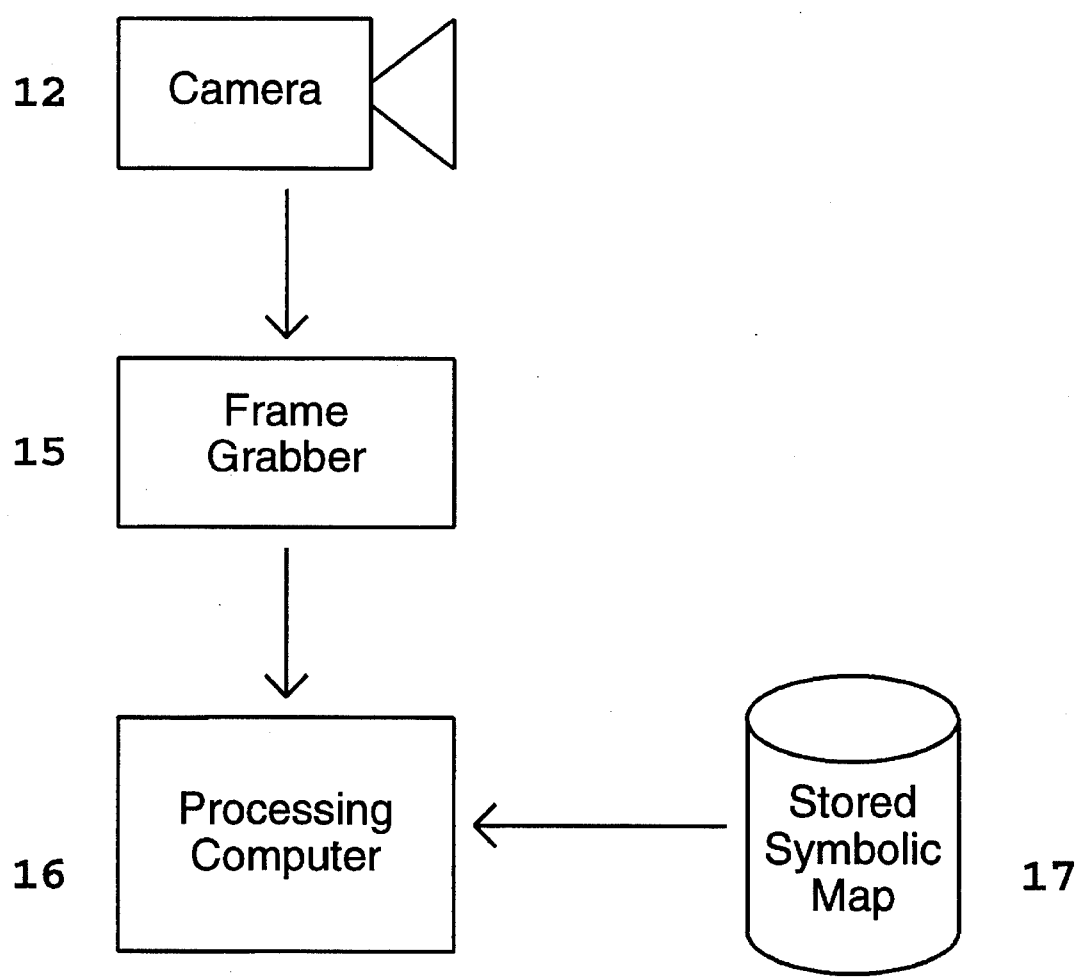
FIG. 2 is a conceptual block diagram of an apparatus for determining position and orientation information according to this invention.
Figure 5A:
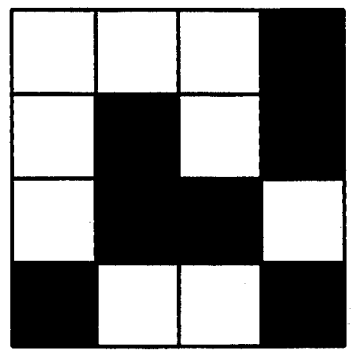
FIGS. 5A–5B illustrate two rotations of a typical four-by-four block of rectangular cells in a landmark and the codes representing those two rotations.
Figure 5B:
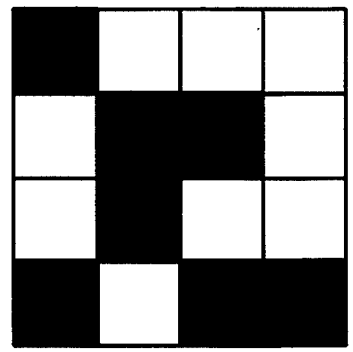

FIG. 2 provides a general conceptual block diagram of the overall image and data processing for location determination employing error-correcting distributed landmarks. FIG. 2 shows the camera 12 providing a video signal to a frame grabber 15, which converts the output of the camera 12 into a base digital image, which is analyzed by the processing computer 16. A stored symbolic map 17 preferably stored in computer memory contains information about each landmark 14. In a preferred embodiment, for each block of each landmark 14, the map provides the location and orientation of the block in three dimensions, as well as dimensions of the landmark 14 measured in terms of the number of cells on each side of the landmark 14. To facilitate fast searching of computer memory in a preferred embodiment, this information on the location, orientation and dimensions of the landmark 14 is organized in computer memory by the code for each block, which is an unsigned binary integer made up from the bits representing the arrangement of cells forming the block. For example, FIG. 5A shows the 16-bit block code for a four-by-four block, and FIG. 5B shows the 16-bit block code for the same block rotated 90 degrees.

In some situations, less information may be stored in the stored symbolic map 17. For example, if mobile robot 11 were constrained to move on a flat surface 13 which is a flat floor, then the entire floor could be covered by a single landmark pattern with fixed dimensions. In this circumstance, the stored symbolic map 17 would only need to store the physical coordinates of one point in a single landmark and the position relative to that point of each block of cells in the single landmark pattern. Similarly, if the camera 12 were constrained to look vertically down at the floor from a constant height, then considerably less processing would be required than if the camera 12 were permitted to move and rotate relative to the mobile robot 11. Further, if the rotation of block patterns were restricted, less ambiguity would exist in the information available from an image of a particular block, and the landmark designer would not need to prevent a recurrence of each rotation of each block. Even if the rotation of blocks were not restricted, but blocks were markedly non-square and the camera 12 were constrained to look at the landmark 14 approximately vertically, then the direction of the length of a block would be easily distinguished from the direction of the width of that block, and the landmark designer would only need to assure that blocks would not recur with 180 degrees rotation.

Figure 3A:
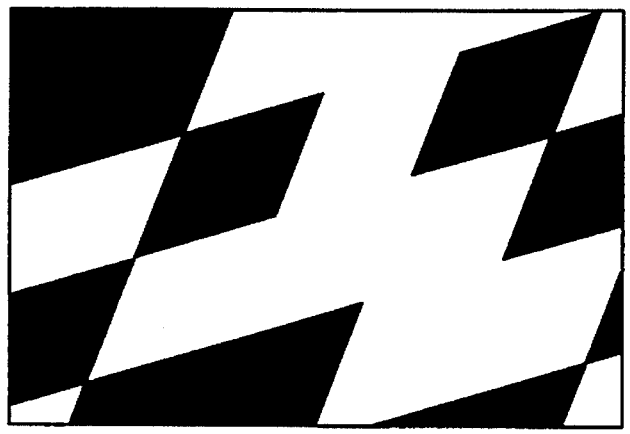
FIG. 3A illustrates a typical field of view captured by the camera, and includes a portion of a landmark displaying a pseudo-random checkerboard pattern according to this invention.

The camera 12 images a pseudo-random checkerboard pattern displayed on a landmark 14. FIG. 3A depicts an illustrative portion of a landmark 14, as captured in a single field of view, resulting in a single camera image. The video signal output from the camera 12 preferably is input into a frame grabber 15, which converts the video signal into a base digital image for processing by the processing computer 16 in conjunction with the information from the stored symbolic map 17. The output of this processing is information on six degrees of freedom of the camera 12—three degrees of freedom for translation and three degrees of freedom for rotation—sufficient to determine the position and orientation of the camera 12 and the mobile robot 11.

Every frame of the video signal does not need to be processed by the processing computer 16; frames need to be processed only as often as required by the particular application to maintain adequate positioning. In addition, the input to the processing computer 16 does not need to be a full-resolution digital image as output by the frame grabber 15. Depending on the application, the base digital image processed by the processing computer 16 may have less resolution than the full resolution digital image output by the frame grabber 15. In a preferred embodiment, the frame grabber 15 produces a full-resolution digital image with 512 picture elements on each side, and with eight bits used to encode the gray level of each picture element in the 512-by-512 full-resolution digital image. In this embodiment, computer preprocessing reduces the number of picture elements by a factor of four in each dimension by averaging the gray level of four-by-four blocks of picture elements in the full-resolution digital image, producing a reduced-resolution base digital image with 128 picture elements on each side. In this embodiment, eight bits are used to encode the gray level of each picture element in this base digital image.

Figure 4:
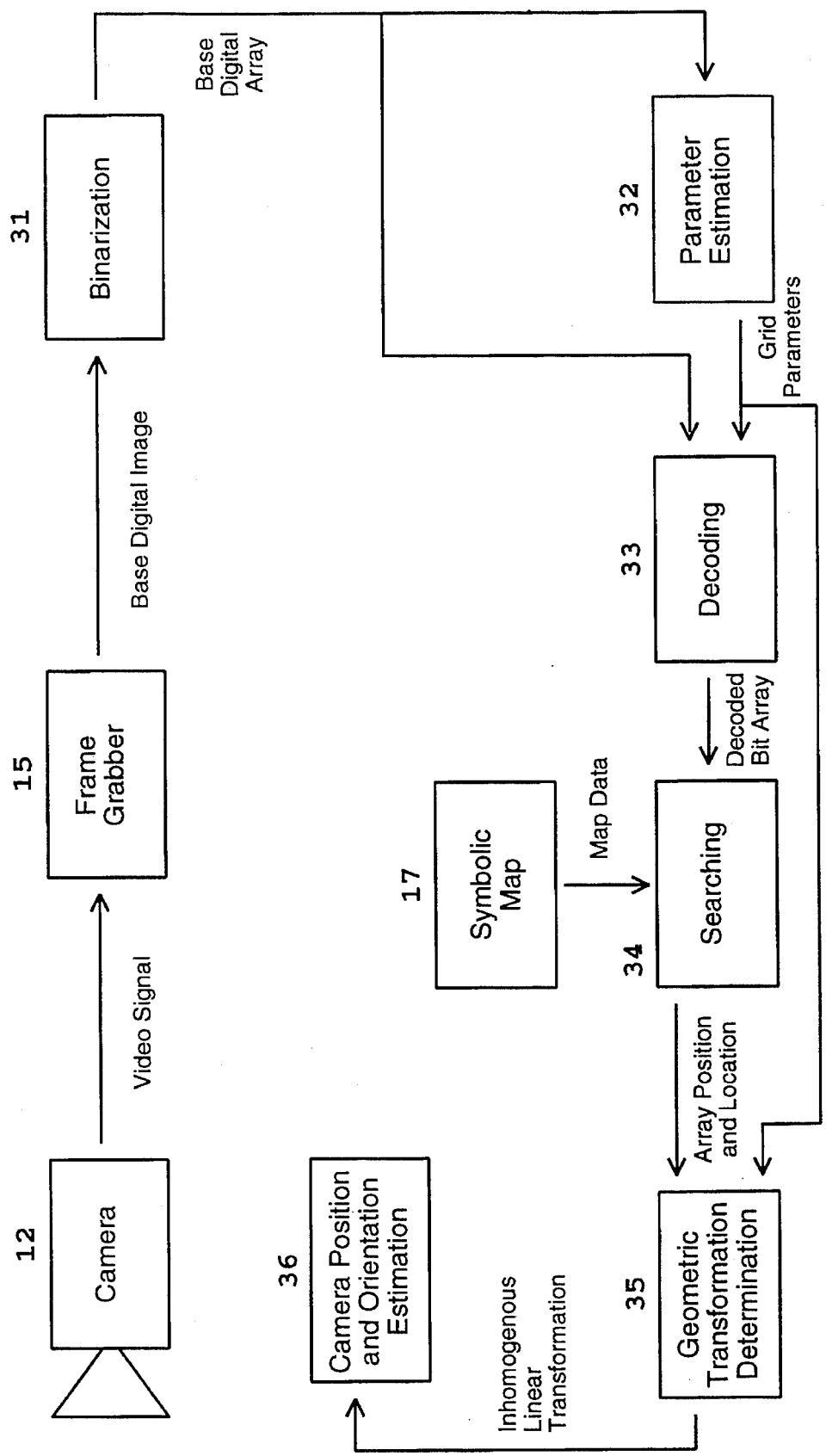
FIG. 4 is a flow diagram summarizing the procedure leading from the camera capturing an image to the calculation of the position and orientation of the camera.
Figure 7:
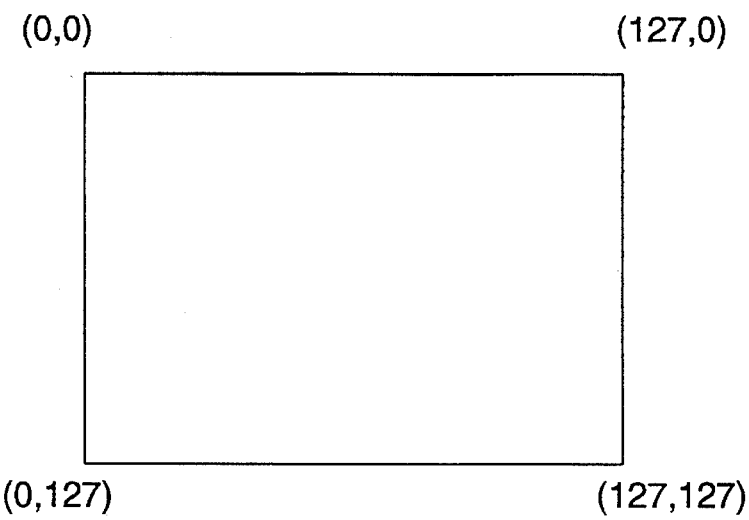
FIG. 7 illustrates different coordinate systems for an image of a pseudo-random checkerboard pattern of a landmark.
Figure 7:
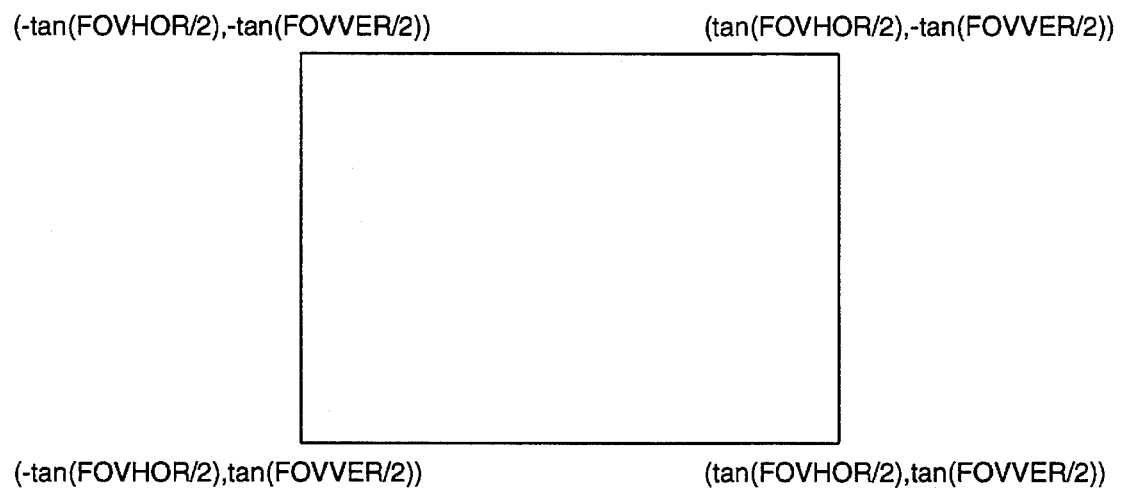

FIG. 4 provides a more detailed block diagram of the processing performed by the processing computer 16. To facilitate description of this processing, several coordinate systems and relationships for images and physical space are defined. Referring to FIG. 7, positions in the base digital image may be identified by the coordinates (x, y) of the base digital image, where x is the column number and y is the row number, with (0, 0) identifying the upper left corner of the base digital image. In a preferred embodiment having a base digital image of size 128-by-128, both x and y coordinates take values in the range {0, 128}. A different coordinate system for the base digital image, which avoids reference to its resolution, may be the "tangent" or normalized (xn, yn) coordinate system. In this system, as shown in FIG. 7, the center of the image has coordinates (0,0) and the range of the x and y coordinates would be (−tan (FOVHOR/2), tan (FOVHOR2)) for xn, and (−tan (FOVVER/2), tan (FOVVER/2)) for yn, where FOVHOR and FOVVER are the horizontal and vertical fields of view of the camera, respectively.

Figure 8:
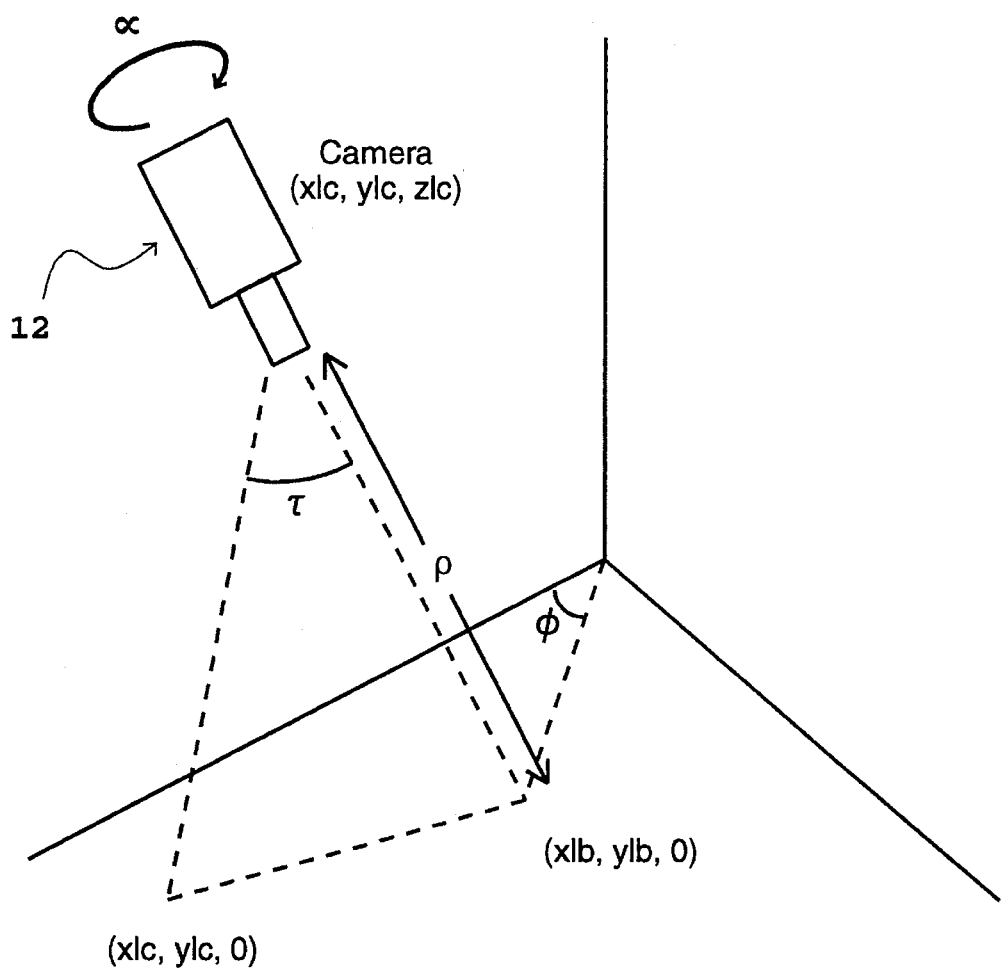
FIG. 8 illustrates parameters of the geometric relationship between the camera and a landmark.

In the plane of each landmark 14, (xl, yl) may denote a system of horizontal and vertical coordinates, respectively, used in the stored symbolic map 17 for identifying, in the plane of the landmark 14 displaying a pseudo-random checkerboard pattern, the location of each block of rectangular cells in that pseudo-random checkerboard pattern. The relationships between coordinates of different landmark planes preferably are included in the stored symbolic map 17. By augmenting the (xl, yl) system with a third orthogonal axis zl, such that zl=0 in the plane of the landmark 14, a three-dimensional coordinate system (xl, yl, zl) may be completed. As shown in FIG. 8, the location in the plane of the landmark 14 of the center of the image of the camera 12 would be identified as (xlb, ylb, 0), and the location relative to the plane of the landmark 14 of the camera 12 itself would be identified as (xlc, ylc, zlc).

As shown in FIG. 4, the recognition and measurement process of the invention has the following six main stages:

1. Binarization 31.
2. Parameter estimation 32.
3. Decoding 33.
4. Searching 34.
5. Geometric transformation determination 35.
6. Camera position and orientation estimation 36.

Each stage is described in detail below.

1. Binarization 31.

A base digital array is formed in which each element of the base digital array preferably corresponds to one picture element in the base digital image to be processed by the processing computer 16. The eight-bit gray level encoding for each picture element in this base digital image preferably is converted to a binary value (0 or 1), which is assigned to the corresponding element in the base digital array. In a preferred embodiment, this conversion is accomplished by local thresholding, so that the value of each of approximately 50% of elements in the base digital array is one. Specifically, in a preferred embodiment, the eight-bit gray level of each picture element in a 128-by-128 base digital image is compared to the median gray level in a local subimage around that picture element of m-by-m picture elements of that base digital image, where a typical value for m is thirty-two. If the gray level of a picture element in this preferred embodiment has a value greater than the median gray level in the local subimage, then the value one is assigned to the element in the base digital array corresponding to that picture element; otherwise the value zero is assigned to that element in the base digital array.

2. Parameter estimation 32.

Figure 3B:
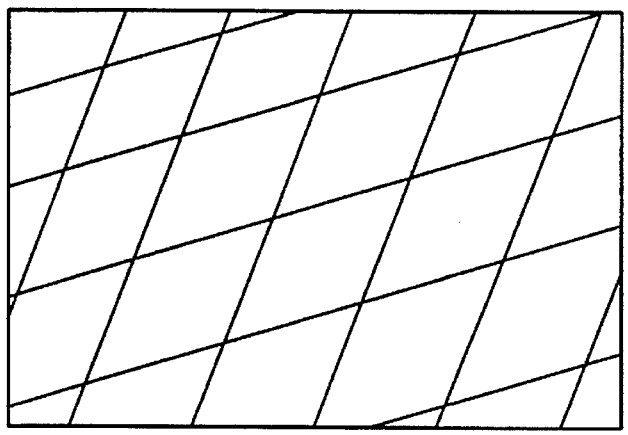
FIGS. 3B–3E depict several geometrical quantities of interest, to be estimated by computer image processing.

Six geometric parameters of the image of the pseudo-random checkerboard patter are estimated. The six parameters preferably are estimated with reference to grid lines defined by the edges between rectangular cells of different colors in the pseudo-random checkerboard pattern, as depicted in the video image, the base digital image and the base digital array. FIG. 3A illustrates the cell edges of a pseudo-random checkerboard pattern image, and FIG. 3B illustrates the grid lines derived from those cell edges.

Figure 3C:
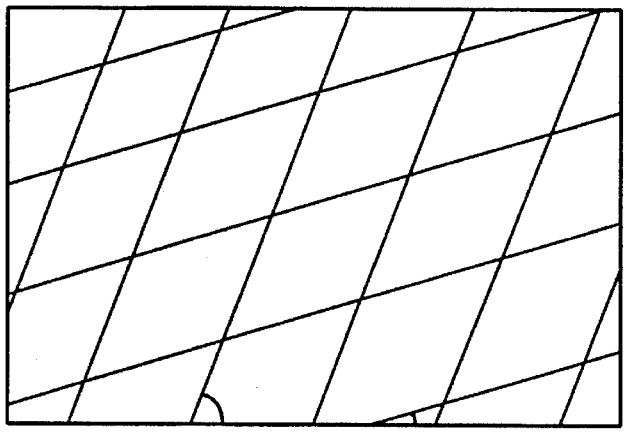
Figure 3D:
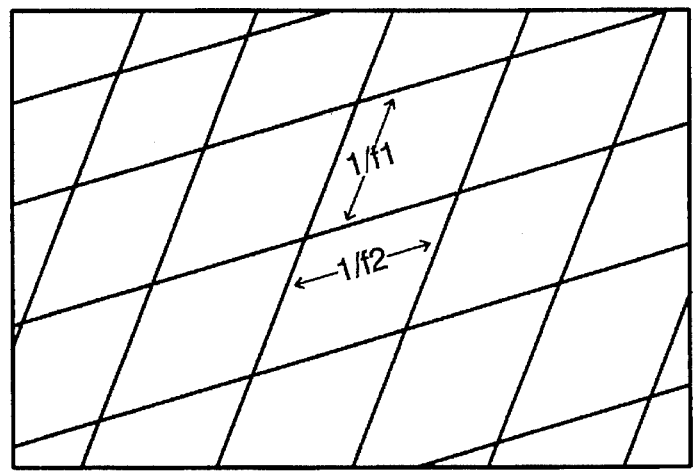
Figure 3E:
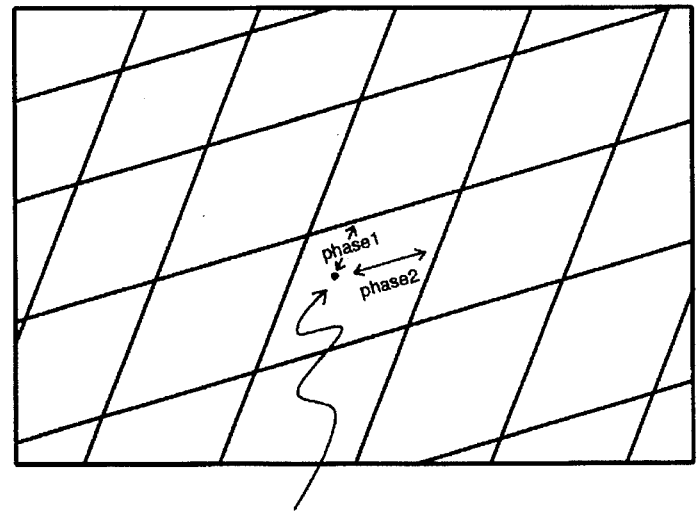

The six parameters are:

a. each of two principal directions of the grid lines, which may be denoted dir1 and dir2, as shown in FIG. 3C, b. a grid density for each of the two principal directions of the grid lines, which may be denoted 1/f1 and 1/f2, as shown in FIG. 3D, and c. a grid phase for each principal direction, which may be denoted phase1 and phase2, as shown in FIG. 3E.

The grid density in a principal direction is defined as the reciprocal of the cell length in that principal direction, as that cell length is depicted in the video image, the base digital image and the base digital array. In FIG. 3D, the cell length in principal direction dir1 is denoted f1, and the cell length in principal direction dir2 is denoted f2. As follows from sampling theorem, the value of each grid density must be less than 0.5.

The grid phase in a principal direction is defined as the distance, along that principal direction, from the center of the image or array to the grid line nearest the center of the image or array. In FIG. 3E, the grid phase in principal direction dir1 is denoted phase1, and the grid phase in principal direction dir2 is denoted phase2. In a preferred embodiment, for purposes of calculating grid phases, the distance from the center of the base digital array to a grid line is measured as the number of base digital array elements between the image center and that grid line. This distance has a non-negative value and is smaller than the reciprocal of the grid density in the relevant principal direction.

Parameter estimation preferably is carried out in three stages: edge detection, coarse principal direction estimation, and fine principal direction estimation. Each of these stages is described in detail below:

Edge detection. Base digital array edge-detection processing preferably produces values for the direction and intensity of each edge depicted in the base digital array. In this edge-detection processing, two directions differing by 180 degrees preferably are considered to be the same direction. In a preferred embodiment, a Sobel-type edge operator is used for edge-detection processing. The operation of a Sobel-edge operator on the base digital array is depicted in FIG. 6. Using this Sobel-type edge operation, the values of the base digital array elements in the three-by-three neighborhood centered on a particular base digital array element are denoted x(1:9), with dhor=(x(1)+2*x(2)+x(3))−(x(7)+2*x(8)+x(9))

dver=(x(1)+2*x(4)+x(7))−(x(3)+2*x(6)+x(9))

Edge-Intensity=dhor*dhor+dver*dver

Edge-Direction=a tan (dver/dhor)

Edge-Intensity and Edge-Direction preferably are calculated for each base digital array element. In a preferred embodiment using the Sobel-type edge operator depicted in FIG. 6, a base digital array element is considered to be an edge element if the element is not on the border of the base digital array, and if the Edge-Intensity of the element is greater than or equal to ten. Since in a preferred embodiment depicted in FIG. 6 each element in the base digital array is assigned a binary value, in this preferred embodiment only twelve possible values exist for Edge-Direction.

Figure 9:
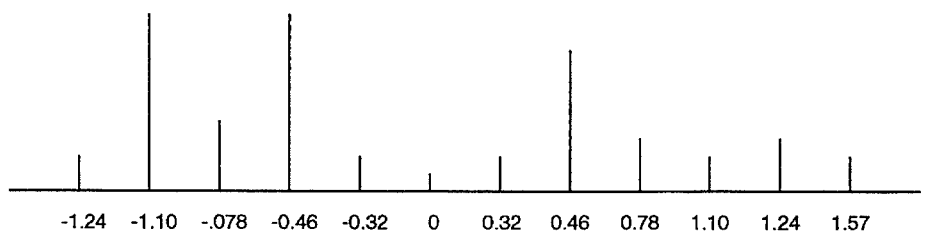
FIG. 9 illustrates the processing of histograms which are part of the system for deriving geometric information from the image of the pseudo-random checkerboard pattern.
Figure 9:
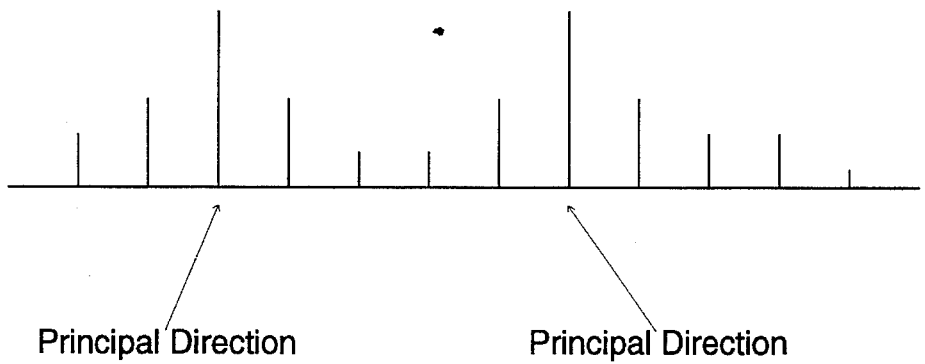

Coarse principal direction estimation. A histogram preferably is constructed to associate with each possible Edge-Direction the number of edge elements with that Edge-Direction. In a preferred embodiment, as depicted in FIG. 9, the resulting histogram is a vector of twelve components, which is considered in cyclic order, i.e., the twelfth component is followed by the first component. The histogram is then smoothed. In a preferred embodiment, the histogram is smoothed by a cyclic running average so that the value associated with each component in this histogram is replaced by the average of that value and the values associated with the two immediately neighboring components in the histogram. The component of the smoothed histogram having the largest value is chosen as the first coarse principal direction. The second coarse principal direction is chosen as the component in the smoothed histogram having the maximum of the histogram values corresponding to a selected number of components farthest from the component selected as the first coarse principal direction. In the preferred embodiment depicted in FIG. 9, the second coarse principal direction chosen as a the maximum of the histogram over the seven components farthest from the first coarse principal direction, i.e., ignoring the component with the largest value and its two neighboring components on either side.

Precise Direction Estimation. For each of the two coarse principal directions, a binary edge image preferably is formed. Each element in each binary edge image preferably corresponds to one element in the base digital array. In a preferred embodiment, each binary edge image has a size of 128-by-128 binary edge image elements. An element in the binary edge image for a coarse principal direction is assigned one binary value (e.g., one) if that element corresponds to a base digital array edge element that has an Edge-Direction differing by at most one from that coarse principal direction; otherwise, the element in the binary edge image is assigned the other binary value (e.g., zero).

The maximum of the spectrum of the binary edge image for a coarse principal direction preferably is considered the precise estimate of that principal direction. Finding this spectrum maximum may entail several steps, as follows:

a. For each coarse principal direction, a grid preferably is constructed of a predetermined number of candidate directions around the coarse principal direction, with grid spacing of a predetermined number of radians. In a preferred embodiment, sixteen candidate directions are chosen around each coarse principal direction, with grid spacing of 0.025 radians (for a total direction range of 0.4 radians over the sixteen candidate directions).

b. For each candidate direction dir for each coarse principal direction, a histogram h preferably is formed of the numbers round((r−m)* cos (dir)+(s−m)* sin (dir)), where r and s range over those points in the binary edge image such that the distance, computed in binary edge image elements, from the center of the binary edge image to the binary edge image element (r, s) is less than m. Since these numbers have 2m possible values in the range {−m, m}, the histogram h can be considered as a 2m-dimensional vector of integers h(1:2m). In a preferred embodiment, m is equal to 64, so that the histogram h is formed from the numbers round((r−64)* cos (dir)+(s−64)* sin (dir)), and the histogram can be considered as a 128-dimensional vector of integers h(1:128).

c. For the histogram h(1:2m) for each candidate direction dir for each coarse principal direction, the discrete Fourier transform preferably is formed of h(1:m) and h(m+1:2m), and the square of the absolute magnitude of each component of h(1:m) and of h(m+1:2m) preferably are added componentwise, yielding a spectrum vector s(1:m) of m dimensions. In a preferred embodiment, from the histogram h (1:128) for each candidate principal direction for each coarse principal direction, the discrete Fourier transform is formed of h(1:64) and h(65:128), and the square of the absolute magnitude of each component of h(1:64) and of each component of h(65:128) are added componentwise to yield spectrum vector s(1:64) of 64 dimensions.

d. From the spectrum vector s(1:m) for each candidate direction dir for each coarse principal direction, imax(dir) preferably is found in the range {2, (m/2)−1} such that s(imax(dir)) has a maximal value smax (dir). The candidate principal direction dir yielding the largest value of smax(dir) for each coarse principal direction preferably is considered the precise estimate of that principal direction. In a preferred embodiment, imax(dir) is found in the range {2, 31}.

For the direction dir yielding the largest smax(dir) for each principal direction, the value of imax(dir) may be refined, preferably by parabolic interpolation using the following formula:

$$\text{imaxr}=\text{imax(dir)}+0.5+(s(\text{imax(dir}+1))-s(\text{imax(dir}-1)))/(s(\text{imax(dir}+1))-2*s(\text{imax(dir)})+s(\text{imax(dir}-1))).$$

The precise estimate of the grid density in a principal direction dir preferably is f=(imaxr(dir)−1)/m for imax(dir), where dir preferably is the precise estimate of that principal direction. The phase in the precise estimate of that principal direction preferably is estimated as the integer j in the range {0,1/f} maximizing the sum $$\sum_{n \text{ integer}} h(j + \text{round}(n/f))$$

where h is the histogram (1:2m) for that principal direction; where f is the precise estimate of grid density in that principal direction; and where n is all integers such that (j+round(n/f)) is in the range {1, 2m}. The precise estimate of the first principal direction may be denoted dir1, and the precise estimate of the second principal direction is denoted dir2, under the convention that sin (dir2−dir1)>0.

3. Decoding 33.

In this stage the bits encoded in the base digital array preferably are decoded into codes in a decoded bit array representing the blocks of cells depicted in the base digital array. As shown in FIG. 4, the inputs to this stage are the six grid parameters resulting from parameter estimation 32 and the base digital array resulting from binarization 31. Each base digital array element may be assigned a coordinate (x', y'), where x' is the column number and y' is the row number in the base digital array. The values for x' and y' are in the range {0, n), where n is the number of rows and columns in the base digital array. The bit position corresponding to each base digital array element may be defined as (x", y") where x"=floor(f1*(cos (dir1)*(x'−(n/2))+sin (dir1)*(y'− (n/2))− phase1 ))

y"=floor(f2*(cos (dir2)*(x'−(n/2))+sin (dir2)*(y'−(n/2))− phase2))

Since f1 and f2 are smaller than 0.5, the bit position coordinates x" and y" are in the range {−(n/2), (n/2)).

In a preferred embodiment, the number of rows and columns n in the base digital array is 128, so that the values of x" and y" in the decoding stage are in the range {0, 128), and x"=floor(f1*(cos (dir1)*(x'−64)+sin (dir1)*(y'−64)− phase1)), and y"=floor(f2*(cos (dir2)*(x'−64)+sin (dir2)*(y'−64)− phase2)).

An average preferably is taken of the values of the base digital array elements, if any, corresponding to each bit position, and the average is rounded. For each bit position, this rounded average may be identified as the bit value corresponding to the bit position. If no base digital array elements correspond to a bit position, the bit may be given a symbolic value, such as dontcare. The result is a decoded bit array of (n/2)-by-(n/2) elements, each of which preferably has a value in a three-element set including the two binary values, zero and one, and the symbolic value. In a preferred embodiment, the decoded bit array has 64-by-64 elements, each with a value in the set {0, 1, dontcare}. FIG. 10 illustrates the decoded bit array resulting from decoding the image in FIG. 2A. In FIG. 10, the decoded bit array elements having the value dontcare correspond to the cells of the pseudo-random checkerboard pattern outside of the field of view of the camera 21.

4. Searching 34.

The searching 34 stage searches for matches between a (n/2)-by-(n/2) decoded bit array and a landmark 14. Because of errors introduced in any real life situation in the decoding stage, a completely perfect match may not exist, so the searching stage preferably produces a best match based on a high incidence of locally perfect matches.

For each p-by-p block in the decoded bit array which does not contain any dontcare values, the index file of the symbolic stored map 17 preferably is searched for a matching code for a p-by-p block of rectangular cells in a pseudo-random checkerboard pattern. For each match, the location of the corresponding pseudo-random checkerboard pattern preferably is determined by reference to the stored symbolic map 17, and a location of a predetermined point in the decoded bit array preferably is deduced. This searching, location-determination and deduction are repeated for rotations of the p-by-p block by 90, 180 and 270 degrees. The result may be one or more tentative positions and orientations of the predetermined point, each such tentative position and orientation corresponding to at least one match between a p-by-p block in the decoded bit array, on the one hand, and a code stored in the stored symbolic map 17 for a p-by-p block of rectangular cells, on the other hand.

The orientation and position of the predetermined point corresponding to the largest number of such matches preferably is tentatively selected as the orientation and position of the predetermined point most likely corresponding to the arrangement of rectangular cells being imaged by the camera 12. If the actual number of matches corresponding to this most likely orientation and position of the predetermined point falls short of a predetermined threshold, then the conclusion would be reached that no useful location information could be extracted from this image by the camera 12. The actual number of matches may fall short of this predetermined threshold because, for example, the image may be degraded, the landmark 14 may be occluded, or the camera 12 may not be pointed at any landmark 14 at the particular time. If the number of matches for more than one orientation and position of the predetermined point exceeds a predetermined threshold, then, although the image from the camera 12 would contain useful location information, this information would not be sufficient to determine a most likely position and orientation for the mobile robot 11.

5. Geometric transformation determination 35.

In this stage, the coordinates (x", y") of each of the elements in the decoded bit array preferably are transformed into coordinates (x'", y'") in the plane of the landmark selected as most likely as a result of the searching 34 stage. This system of coordinates (x'", y'") in the plane of that landmark preferably is parallel to the grid, is measured in cell units, and is centered at the point corresponding to the upper left corner of the decoded bit array. The transformation from digital bit array coordinates (x", y") to landmark coordinates (x'", y'") may be given by the following inhomogeneous linear transformation:

$$\begin{pmatrix} x''' \\ y''' \end{pmatrix} = R^{4-k} \begin{pmatrix} f1\cos(dir1) & f1\sin(dir1) \\ f2\cos(dir2) & f2\sin(dir2) \end{pmatrix} \begin{pmatrix} x''-64 \\ y''-64 \end{pmatrix} + \begin{pmatrix} -f1phase1 \\ -f2phase2 \end{pmatrix}$$

where 90*k degrees is the rotation of decoded bit array corresponding to the pseudo-random checkerboard pattern selected by the searching 34 stage as the pseudo-random checkerboard pattern most likely being imaged by the camera 12; where R is the inhomogeneous linear transformation (u, v)->((n/2)-v, u); where $R^{4-k}$ means R applied 4-k times; and where n is the number of columns and rows of elements in the base digital array. As a result of the convention that sin (dir2-dir1)>0, the orientation of the inhomogeneous linear transformation R is positive.

Precise landmark-to-image mapping would result in a projective transformation, rather than a linear transformation. While the linear transformation utilized in this geometric transformation determination 35 stage is accordingly an approximation, this linear transformation is entirely adequate for purposes of estimating the position and orientation of the camera 12.

Two further changes of coordinates preferably are made. Using the geometric information from the stored symbolic map 17, the landmark coordinates (x'", y'") may be converted to coordinates (xl, yl) in the plane of the landmark 14, and the decoded bit array coordinates (x", y") are converted to normalized coordinates (xn, yn). These coordinate conversions result in an inhomogeneous linear transformation of the following form:

(xl, yl)=A(xn, yn)+(xlb, ylb)

where (xlb, ylb) is the point in landmark plane corresponding to image center and A is a two-by-two matrix.

6. Camera position and orientation estimation 36.

In this stage, the six degrees of freedom of the camera 12 preferably are estimated. As depicted in FIG. 8, these six degrees of freedom are the three coordinates (xlc, ylc, zlc) providing the position of the camera 12 relative to a predetermined point in the pseudo-random pattern on the landmark 14 selected as the most likely being viewed by the camera 12; and the angles φ, α, and τ, where φ is the angle, with vertex at xlc=ylc=zlc=0, between the xlc axis and the direction from that vertex to the point in the landmark plane corresponding to the center of the camera image, and α and τ are the two rotation angles of the camera 12 about the point (xlc, ylc, zlc). In a preferred embodiment, this predetermined point is the upper left corner of the pseudo-random pattern of the landmark 14 selected as the most likely being viewed by the camera 12.

To estimate these six degrees of freedom, the two-by-two matrix A derived in the geometric transformation determination 35 stage preferably is decomposed into the following product:

$$A = \begin{pmatrix} \cos(\alpha) & -\sin(\alpha) \\ \sin(\alpha) & \cos(\alpha) \end{pmatrix} \begin{pmatrix} \lambda_1 & 0 \\ 0 & \lambda_2 \end{pmatrix} \begin{pmatrix} \cos(\phi) & -\sin(\phi) \\ \sin(\phi) & \cos(\phi) \end{pmatrix}$$

where $0<\lambda_1 \leq \lambda_2$. This decomposition is a standard computational process known in numerical linear algebra as singular value decomposition (SVD). The resulting angles α and φ are two of the desired orientation angles. The third angle τ preferably is computed as follows:

τ=a cos ($\lambda_1/\lambda_2$).

The spherical coordinates of the camera 12 with respect to the point in the plane corresponding of the landmark 14 to the center of the image of the camera 12 may be denoted (ρ, φ, τ), where ρ=1/$\lambda_1$. These spherical coordinates (ρ, φ, τ) may be converted to Cartesian coordinates and added to (xlb, ylb, 0) to obtain the camera position (xlc, ylc, zlc), as follows:

xlc=xlb+ρcos (φ) sin (τ)

ylc=ylb+ρsin (φ) sin (τ)

zlc=ρcos (τ).

Once the position and orientation of the camera 12 are estimated, the position and orientation of the mobile robot 11 can be readily determined from means for relating the position and orientation of the camera 12 to the mobile robot 11.

The described method and apparatus for determining a position and orientation of a mobile robot 11 may yield more than one candidate from a single image for the position and orientation of the camera 12, for example because there are too few rectangular cells in the field of view. In such cases, the ambiguity in the position or orientation of the camera 12 may be resolved by integration of successive measurements. In its simplest form, this ambiguity resolution may involve comparing the distance between possible successive positions of the mobile robot 11 with a maximum distance that may be travelled by the mobile robot 11 in the time interval elapsed between the successive measurements, and rejecting position combinations that exceed the maximum distance. After a sufficiently long sequence of such successive measurements, only one position and orientation combination would survive this consistency test. More generally, if a dynamical model for motion of the camera 12 and of the mobile robot 11 is available, any of the tracking filters known in the art of "Data Association" may be used, for example including probabilistic data association (PDA) or multi-hypothesis filters, using the ambiguous measurements of position and orientation as inputs.

It will be apparent to those skilled in the art that various modifications can be made to this invention of mobile robot location determination employing error-correcting distributed landmarks without departing from the scope or spirit of the invention. It is also intended that the present invention cover modifications and variations of the mobile robot location determination employing error correcting distributed landmarks, provided they come within the scope of the appended claims and their equivalents.

I claim:

1. A method, using at least one landmark within a predetermined space, each landmark displaying a pseudo-random-checkerboard pattern on a plane, with the pseudo-random-checkerboard pattern having a first plurality of rectangular cells, for determining a location of an autonomous vehicle, comprising:

imaging at least one pseudo-random-checkerboard pattern;

generating, in response to imaging the pseudo-random-checkerboard pattern, a signal;

orienting a camera relative to the autonomous vehicle; and determining, in response to the signal and to camera orientation, a position and an orientation of the autonomous vehicle.

2. The method as set forth in claim 1, further comprising the steps of:

emitting, from each of the first plurality of rectangular cells, one of two different characteristic responses to radiation from at least one landmark displaying the pseudo-random-checkerboard pattern; and generating, in response to each of the two different characteristic responses, the signal.

3. The method as set forth in claim 2, further comprising the steps of:

converting the signal into a base-digital image depicting a plurality of overlapping rectangular blocks, the base-digital-image having a plurality of adjacent picture elements corresponding to a second plurality of adjacent rectangular cells, each of the plurality of adjacent picture elements corresponding to one of two substantially contrasting colors;

storing a representation and a location of each of the plurality of overlapping rectangular blocks of each pseudo-random-checkerboard pattern in a symbolic map;

analyzing the base-digital image and the symbolic map; and calculating the position and the orientation of the autonomous vehicle.

4. The method as set forth in claim 3, further comprising the steps of:

creating, in response to the base-digital image, a base-digital array having a plurality of base-digital-array elements, each of the plurality of base-digital-array elements having a first binary value, wherein the base-digital array further comprises a plurality of second binary values, each corresponding to a predetermined number of the plurality of adjacent picture elements of the base-digital image;

selecting each first binary value by associating a predetermined number of the plurality of second binary values with each of the base-digital-array elements;

detecting a plurality of grid edges and a plurality of grid lines, the plurality of grid edges formed by analyzing each first binary value, and the plurality of grid lines formed by the plurality of grid edges;

estimating a first principal direction of the plurality of grid lines, a second principal direction of the plurality of grid lines, a first grid density of the plurality of grid lines, a second grid density of the plurality of grid lines, a first grid phase comprising a first distance, along the first principal direction, from a first image center to a grid line nearest the first image center, and a second grid phase comprising a second distance, along the second principal direction, from the first image center to a grid line nearest the first image center;

decoding the first binary value of each of the plurality of base-digital-array elements into a decoded-bit array having a plurality of decoded-bit-array elements, each of the decoded-bit-array elements having a third binary value and corresponding to the plurality of base-digital array elements corresponding to one of the second plurality of adjacent rectangular cells;

searching, using the symbolic map, for a representation and a location corresponding to the plurality of overlapping rectangular blocks;

determining a geometric transformation for mapping the plurality of decoded-bit array elements to the plurality of overlapping rectangular blocks; and estimating, using the geometric transformation, the position and the orientation of the autonomous vehicle.

5. The method as set forth in claim 4, further comprising the steps of:

assigning an edge intensity and an edge direction to each of the plurality of base-digital-array elements, with at least one edge intensity exceeding a first predetermined value;

estimating a first coarse principal direction and a second coarse principal direction of the plurality of grid lines; and specifying a first precise principal direction and a second precise principal direction of the plurality of grid lines.

6. The method as set forth in claim 5, further comprising the steps of:

counting, for each of the plurality of edge directions, the base-digital array elements having that edge direction and having an edge intensity exceeding a second predetermined value;

forming a first histogram of a plurality of edge directions by associating, with each of the plurality of edge directions, the count of the base-digital-array elements having that edge direction and having an edge intensity exceeding the second predetermined value;

smoothing the first histogram into a smoothed histogram having a plurality of smoothed-edge intensities, by taking a cyclic running average, over a first predetermined number of edge directions, of the count in the first histogram of base-digital-array elements associated with each of the first predetermined number of edge directions;

choosing a first coarse-principal-direction of the plurality of grid lines, by selecting an edge direction of the smoothed histogram corresponding to a greatest value of the plurality of smoothed-edge-intensities; and choosing a second coarse-principal-direction of the plurality of grid lines, by selecting an edge direction of the smoothed histogram corresponding to a greatest value of the plurality of smoothed-edge-intensities corresponding to a second predetermined number of edge directions located a third predetermined number of edge directions away from the first coarse-principal-direction.

7. An apparatus for determining a location of an autonomous vehicle, comprising:

at least one landmark within a first predetermined space, each landmark displaying a pseudo-random-checkerboard pattern on a plane;

camera means for imaging at least one pseudo-random-checkerboard pattern and for generating, responsive to the imaged pseudo-random-checkerboard pattern, a signal;

relational means for orienting the camera means relative to the autonomous vehicle; and locating means, responsive to the signal and to the relational means, for determining a position and an orientation of the autonomous vehicle.

8. The apparatus as set forth in claim 7, further comprising:

at least one landmark having the pseudo-random-checkerboard pattern with a plurality of rectangular cells, each of the plurality of rectangular calls emitting one of two different characteristic responses to radiation; and wherein the camera means responds to each of the two different characteristic responses.

9. The apparatus as set forth in claim 8, wherein each of the plurality of rectangular cells substantially uniformly displays one of two substantially contrasting colors.

10. The apparatus as set forth in claim 9, with approximately one-half of the first plurality of adjacent rectangular cells displaying a first color.

11. The apparatus as set forth in claim 10, wherein:

each landmark having a pseudo-random-checkerboard pattern displays a first plurality of overlapping rectangular blocks formed from the plurality of rectangular cells, each of the first plurality of overlapping rectangular blocks having:
  a location in the predetermined space;
  a first side;
  a second side;
  a first predetermined number of the plurality of rectangular cells on the first side;
  a second predetermined number of the plurality of rectangular cells on the second side; and
  a plurality of rotations;

each of the plurality of rotations of each of the first plurality of overlapping rectangular blocks displays a first arrangement of adjacent rectangular cells different from an arrangement of rectangular cells displayed by each other rotation of the same overlapping rectangular block of the first plurality of overlapping rectangular blocks, different from an arrangement of rectangular cells displayed by each of a plurality of rotations of each other overlapping rectangular block in the first plurality of overlapping rectangular block, and different from an arrangement of rectangular cells displayed by each of a plurality of rotations of each of a plurality of rectangular blocks displayed by each other pseudo-random-checkerboard pattern displayed by each other landmark in a second predetermined space; and wherein the signal depicts a second plurality of overlapping rectangular blocks, corresponding to the first plurality of overlapping rectangular blocks of one pseudo-random-checkerboard pattern, wherein each of the second plurality of overlapping rectangular blocks has a second plurality of rectangular cells.

12. The apparatus as set forth in claim 11, wherein the locating means further comprises:

a frame grabber for converting the signal into a base-digital image depicting the second plurality of overlapping rectangular blocks, the base-digital image having a first plurality of adjacent picture elements, each of the plurality of adjacent picture elements corresponding to one of the two substantially contrasting colors;

symbolic-map means for storing symbolic-map information, including a representation and a location of each of the first plurality of overlapping rectangular blocks of each pseudo-random-checkerboard pattern; and digital-computer means for analyzing the base-digital image and the symbolic-map information and for calculating the position and the orientation of the autonomous vehicle.

13. The apparatus as set forth in claim 12, wherein the digital-computer means further comprises:

binarization means, responsive to the base-digital image, for creating a base-digital array having a plurality of base-digital-array elements, each of the plurality of base-digital-array elements having a first binary value;

image-processing means, responsive to the binarization means, for detecting a plurality of grid edges and a plurality of grid lines, the plurality of grid edges formed by analyzing each first binary value, and the plurality of grid lines formed by the plurality of grid edges;

parametric means, responsive to the binarization means and to the image-processing means, for estimating a first principal direction of the plurality of grid lines, a second principal direction of the plurality of grid lines, a first grid density of the plurality of grid lines, a second grid density of the plurality of grid lines, a first grid phase comprising a first distance, along the first principal direction, from a first image center to a grid line nearest the first image center, and a second grid phase comprising a second distance, along the second principal direction, from the first image center to a grid line nearest the first image center;

decoding means, responsive to the binarization means and to the parametric means, for decoding the first binary value of each of the plurality of base-digital-array elements into a decoded-bit array having a plurality of decoded-bit-array elements, each of the decoded-bit-array elements corresponding to one of the second plurality of rectangular cells and having a second binary value;

searching means, responsive to the decoded-bit array and to the symbolic-map information, for searching for a representation and a location corresponding to the second plurality of overlapping rectangular blocks;

geometric means, for determining a geometric transformation for mapping the plurality of decoded-bit-array elements to the second plurality of overlapping rectangular blocks; and positioning means, responsive to the geometric transformation, for estimating the position and the orientation of the autonomous vehicle.

14. The apparatus as set forth in claim 13, wherein the parametric means further comprises:

edge-detecting means for detecting an edge intensity and an edge direction for each of the plurality of base-digital-array elements;

at least one edge-picture-element comprising one of the plurality of base-digital-array elements having an edge intensity greater than a predetermined value and having the edge direction detected for that base-digital-array element;

coarse-principal-directing means, responsive to the edge-detecting means, for estimating a first coarse-principal-direction and a second coarse-principal-direction of the plurality of grid lines; and precise-principal-directing means, responsive to the coarse-principal-directing means, for estimating a precise estimate of the first principal direction of the plurality of grid lines and a precise estimate of the second principal direction of the plurality of grid lines.

15. The apparatus as set forth in claim 14, wherein the edge-detecting means further comprises a Sobel edge operator.

16. The apparatus as set forth in claim 14, wherein the coarse-principal-directing means further comprises:

means for forming a first histogram of a plurality of edge directions by associating, with each of the plurality of edge directions, a count of the edge-picture elements having that edge direction;

means for smoothing the first histogram into a smoothed histogram having a plurality of smoothed values, by taking a cyclic running average, over a first predetermined number of edge directions, of the count in the first histogram associated with each of the plurality of edge directions of the first histogram;

first means for choosing a first coarse-principal direction of the plurality of grid lines, by selecting the edge direction of the smoothed histogram corresponding to a greatest smoothed value of the smoothed histogram; and second means for choosing a second coarse-principal direction of the plurality of grid lines, by selecting the edge direction of the smoothed histogram corresponding to a greatest smoothed value of the smoothed histogram corresponding to a second predetermined number of edge directions located a third predetermined number of edge directions away from the first coarse-principal-edge-direction.

17. The apparatus as set forth in claim 14, wherein the precise-principal-directing means further comprises:

means, responsive to the coarse-principal-directing means, for forming a first binary-edge image having a first plurality of binary-edge-image elements and a first spectrum;

means, responsive to the coarse-principal-directing means, for forming a second binary-edge image having a second plurality of binary-edge-image elements and a second spectrum; and spectrum-maximizing means, responsive to the first spectrum and to the second spectrum, for determining a first maximum of the first spectrum, for associating the precise estimate of the first principal direction of the plurality of grid lines with the first maximum, for determining a second maximum of the second spectrum, and for associating the precise estimate of the second principal direction with the second maximum.

18. The apparatus as set forth in claim 17, wherein the spectrum-maximizing means further comprises:

grid-forming means for forming a grid of a specified number of candidate-principal directions around a selected coarse-principal direction, the grid having a grid spacing of a predetermined size;

means for associating, with each binary edge element less than a specified distance from a second image center, a third binary value calculated according to a specified method;

means for forming an edge-direction histogram, having a plurality of components representing a predetermined number of the plurality of edge directions, for associating with each component one of the predetermined number of the plurality of edge directions and the number of binary-edge elements having that edge direction;

means for dividing the plurality of components of the edge-direction histogram into a first half and a second half, each of the first half of the plurality of components corresponding to one of the second half of the plurality of components;

Fourier transform means for forming:

a first discrete Fourier transform of the first half of the plurality of components, the first discrete Fourier transform having a first plurality of component values, each of the first plurality of component values associated with one of the first half of the plurality of components and having an absolute magnitude; and a second discrete Fourier transform of the second half of the plurality of components, the second discrete Fourier transform having a second plurality of component values, each of the second plurality of component values associated with one of the second half of the plurality of components and having an absolute magnitude;

squaring means for calculating the square of the absolute magnitude each of the first plurality of component values and the square of the absolute magnitude of each of the second plurality of component values;

spectrum vectoring means for forming a spectrum vector having a plurality of spectrum-vector components, each spectrum-vector component corresponding to one of the first plurality of component values and to one of the second plurality of component values and associated with the sum of the square of the absolute magnitude of the corresponding component value of first plurality of component values; and the square of the absolute magnitude of the corresponding component value of the second plurality of component values;

further estimating means, responsive to the first spectrum vector, for specifying a precise estimate of the principal direction.

19. The apparatus as set forth in claim 14, wherein the searching means further comprises:

means for selecting, for each arrangement of rectangular cells displayed by each rotation of each of the second plurality of overlapping rectangular blocks, a representation stored in the symbolic map information matching that arrangement of rectangular cells;

means for deducing, from each matching arrangement of rectangular cells, a likely position and a likely orientation in the first predetermined space for the second plurality of rectangular cells;

means for selecting, from the likely position and the likely orientation for each matching arrangement of rectangular cells, a most likely position and a most likely orientation in the first predetermined space for the second plurality of rectangular cells.

20. The apparatus as set forth in claim 14, wherein the precise-principal-directing means further comprises ambiguity-resolving means for selecting the most likely position of the autonomous vehicle and the most likely orientation of the autonomous vehicle when the digital-computer means calculates a plurality of likely positions of the autonomous vehicle.

21. The apparatus as set forth in claim 20, wherein the ambiguity-resolving means comprises:

timekeeping means for determining a time elapsed between producing the plurality of likely positions and the plurality of likely orientations of the autonomous vehicle and estimating at least one second position and at least one second orientation of the autonomous vehicle;

measuring means for estimating a maximum distance travelled by the autonomous vehicle during the time elapsed;

eliminating means, responsive to the timekeeping means and to the measuring means, for selecting the position and orientation of the autonomous vehicle.

22. The apparatus as set forth in claim 12, wherein:

the frame grabber converts the signal into a pre-processed digital image having a plurality of adjacent pre-processed-digital-image elements;

the number of the first plurality of adjacent picture elements of the base-digital image is a predetermined fraction of the number of adjacent pre-processed-digital-image elements; and pre-processing means associates a binary value with each of the first plurality of adjacent picture elements of the base-digital image by averaging, over a predetermined number of the adjacent pre-processed-digital-image elements corresponding to that adjacent picture element of the base-digital image, a suitable attribute of each of the predetermined number of the pre-processed-digital-image elements corresponding to that adjacent picture element of the base-digital image.

23. A method for manufacturing an apparatus for determining the location of an autonomous vehicle, comprising:

placing at least one landmark within a predetermined space, each landmark having a plane;

displaying on the plane of each landmark a pseudo-random-checkerboard pattern;

equipping the autonomous vehicle with:

a camera for imaging at least one pseudo-random checkerboard pattern and for generating, in response to the imaged pseudo-random-checkerboard pattern, a signal;

relational means for orienting the camera relative to the autonomous vehicle; and locating means, responsive to the signal and the relational means, for determining a position and an orientation of the autonomous vehicle.

* * * * *